(12) United States Patent
French et al.

(10) Patent No.: US 7,047,239 B2
(45) Date of Patent: May 16, 2006

(54) METHOD AND APPARATUS FOR AN INTERACTIVE INTERFACE

(75) Inventors: Ronal Richard French, Oronoco, MN (US); Dennis Robert Hahn, Pittsboro, NC (US); Brian Richard Lepel, Rochester, MN (US); Randy Eugenio Oyarzabal, Kasson, MN (US); Nathan G. Steffenhagen, Eau Claire, WI (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 10/028,842

(22) Filed: Dec. 20, 2001

(65) Prior Publication Data

US 2003/0120657 A1 Jun. 26, 2003

(51) Int. Cl.
*G06F 17/30* (2006.01)
(52) U.S. Cl. .................. 707/6; 707/2; 707/8; 707/9; 707/10; 707/201
(58) Field of Classification Search .............. 707/1–10, 707/100–104.1, 200–206; 709/204–207; 717/168–173
See application file for complete search history.

(56) References Cited

U.S. PATENT DOCUMENTS

| | | | |
|---|---|---|---|
| 6,230,156 B1 * | 5/2001 | Hussey | 707/10 |
| 6,405,243 B1 * | 6/2002 | Nielsen | 709/206 |
| 6,654,746 B1 * | 11/2003 | Wong et al. | 707/10 |

* cited by examiner

*Primary Examiner*—Jean M. Corrielus
*Assistant Examiner*—Isaac M. Woo
(74) *Attorney, Agent, or Firm*—Patterson & Sheridan, LLP

(57) ABSTRACT

Method, article of manufacture and apparatus for communicating between a first system and a second system. One embodiment provides a method for communicating between a first system and a second system each having an associated database, in which at least one of the systems is configured to prevent the other of the two systems from directly accessing its respective database. Interfaces are implemented at each of the system, wherein the interfaces extract data from the respective databases of the respective systems as well as from incoming messages from the other system. In one embodiment, the message contains information about a defect found in an application being developed in the second system. Encoding and decoding techniques may be used by the systems to generate and communicate the messages between one another.

18 Claims, 4 Drawing Sheets

METHOD AND APPARATUS FOR AN INTERACTIVE INTERFACE

BACKGROUND OF THE INVENTION

1. Field of the Invention

The present invention generally relates to an interactive interface between different systems.

2. Description of the Related Art

When two separate systems need to communicate, a preferred method is to use a true connection where the two systems pass data directly back and forth (each sending and receiving). Alternatively, a middleware program which establishes direct connections to each system may be utilized to transport the data between the two systems. However, in some cases, a direct connection to or between the two systems is not feasible because system incompatibility and/or security mechanisms prevent one system from receiving communications from another system.

For example, a problem management application (e.g., UVATS®) which utilizes a Lotus Notes® database cannot send data directly to a developer application (e.g., CMVC®) which utilizes a database system based on an AIX®/UNIX® system because security restrictions do not allow the Lotus Notes® database to directly write to the CMVC® data files. Similarly, there are no built-in methods for CMVC® to write to the Lotus Notes® database. Also, existing tools that perform a translator function (e.g. ODBC) to interface between the two systems cannot solve the problem because of the security mechanisms and system incompatibility.

CMVC® (Configuration Management and Version Control) is a client-server application which provides mechanisms for identifying, monitoring, and managing changes made to a software baseline. The baseline may contain any type of data, including: documentation, design and specification data, and build and compile control information, as well as the source code itself. One aspect of the CMVC application is problem tracking of defects in an application/software being developed.

UVATS® (Universal Verification and Test System) is a problem management application which facilitates the development, storage, sharing of test scripts and the creation and execution of tests to verify the functionality of an application or a system. UVATS is a highly configurable Lotus Notes® application with the capability to store and manage test scripts which are linked into test cases. As a result of testing an application or a system, one or more defects may be encountered that result in the creation of Test Incident Reports (TIRs) from testers when test results do not meet criteria. The TIRs provide testers and defect resolvers/managers a source to view testing/defect results and resolution progress.

The CMVC® and UVATS® applications may be utilized together to test manage and correct a defect in a developing application. However, communication between testers (UVATS® system) and developers (CMVC® system) is typically achieved through manual methods such telephone calls and manually generated and transmitted e-mails using a separate electronic mail client. These approaches are costly in terms of time and resources for the testers and developers because the communications require significant manual steps and the exchanged information must be manually updated to each system. Furthermore, errors and delays are likely to occur because of the manual updates.

Therefore, there is a need for an interactive interface which facilitates communication between two systems. Also, there is a need for an interactive interface which automatically retrieves and stores data to appropriate databases as triggered by the communication between the two systems.

SUMMARY OF THE INVENTION

Embodiments of the invention generally provides method and apparatus for communicating between a first system and a second system. One embodiment provides a method comprising generating, at the first system, a first electronic document containing information; invoking a first e-mail code to transmit the first electronic document from the first system to the second system; invoking the e-mail code to receive, at the first system, a second electronic document from the second system; and updating data in a first database of the first system utilizing information in the second electronic document. In one embodiment, the first electronic document contains information about a defect found in an application being developed in the second system. Encoding and decoding techniques may be used by the systems to generate and communicate the first and second documents between one another.

In one embodiment the first system is a Lotus Notes system and the second system is a non-Lotus Notes system. In another embodiment the first system comprises a problem management system and the second system comprises developer system.

One embodiment provides an interactive interface which facilitates communication between a problem management system and a developer system. Another embodiment provides an interactive interface which automatically retrieves and stores data to appropriate databases as triggered by the communication between the two systems. In one embodiment, encoded e-mail messages are utilized to communicate between the problem management system and a developer system.

Another embodiment provides a signal bearing medium, comprising a program which, when executed by a processor, performs an operation implementing any of the foregoing methods.

Another embodiment provides a computer system, comprising a first system and a second system connected by a network and each comprising a database, wherein at least one of the two systems is configured to prevent the other of the two systems from directly accessing its respective database. Further each of the systems comprises an e-mail communications facility and an interactive interface. The first and second interactive interfaces are configured to invoke the first and second e-mail communications facilities, respectively, for communication between one another via the network, and access data in the first and second databases, respectively; whereby data is transferred between the first and second databases. In one embodiment, the one of the systems is a Lotus Notes system. In one embodiment, the Lotus Notes system is a problem management system and the other system is a developer system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the invention generally provide method and apparatus for communicating between a first and a second system. In one embodiment, encoded e-mail messages are utilized to communicate between the first system and the second system.

As used herein, a "system" may refer to a distinct hardware component, such as a computer. In this case, two systems may communicate via a network connection. Alternatively, a system may refer to a software environment executable on hardware. In the context of the latter definition, two distinct software environments may be executing on a common hardware infrastructure, such as where the software environments comprises two separate database management systems.

One embodiment of the invention is implemented as a program product for use with a computer system such as, for example, the server systems shown in FIG. 1 and described below. The program(s) of the program product defines functions of the embodiments (including the methods described below with reference to FIGS. 3 and 4) and can be contained on a variety of signal/bearing media. Illustrative signal/bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be implemented as part of an operating system or a specific application, component, program, module, object, or sequence of instructions. The inventive computer program(s) is typically comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
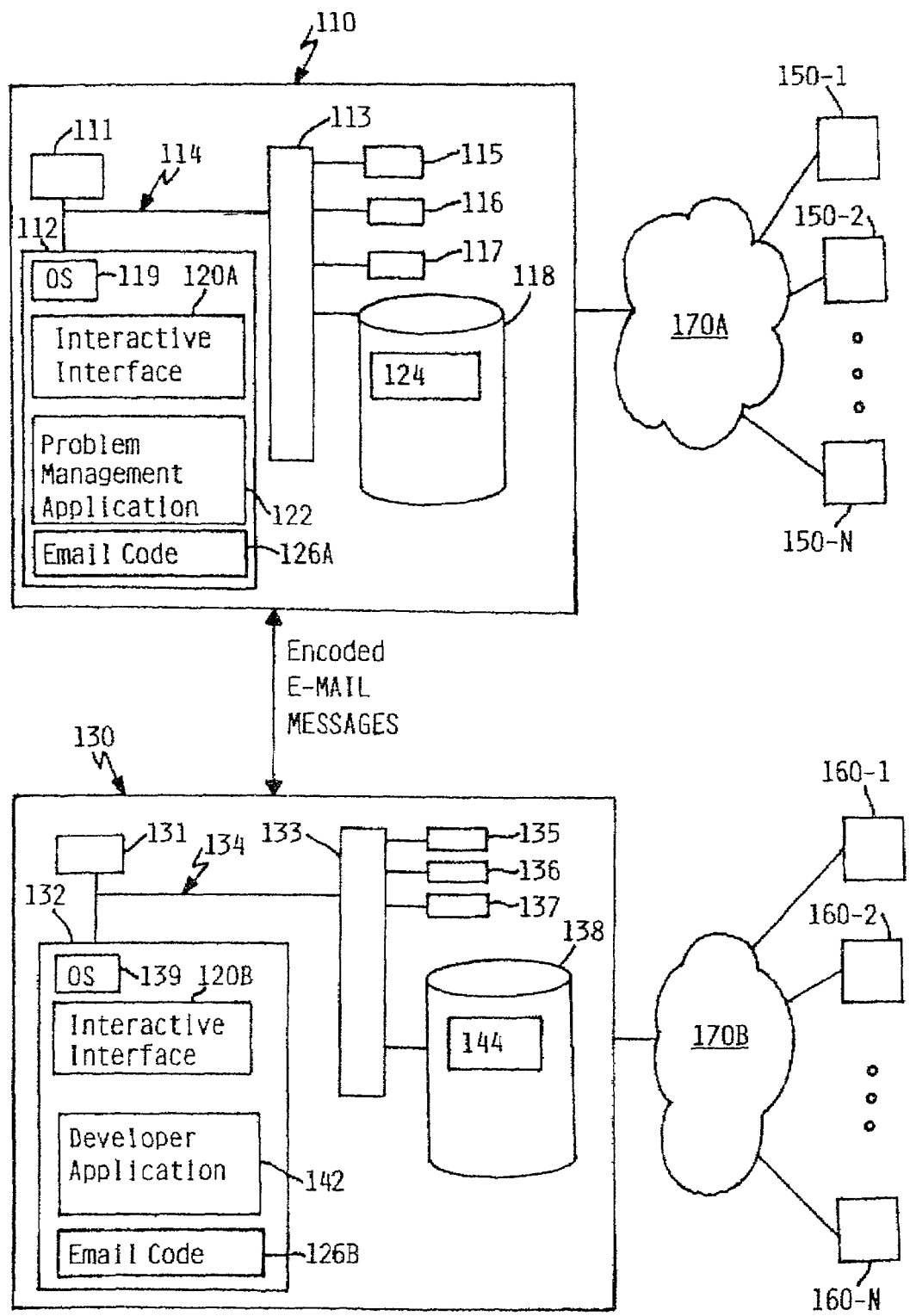
FIG. 1 is a schematic diagram illustrating one embodiment of an interactive interface implemented to facilitate communication between a first system and a second system.

FIG. 1 is a schematic diagram illustrating one embodiment of an interactive interface implemented to facilitate communication between a first system and a second system, each of which implement and maintain a database. As shown in FIG. 1, the interactive interface utilizes an e-mail system to communicate encoded e-mail messages between a first system and a second system. At least one of the systems does not allow direct access (e.g., by use of middleware, ODBC, etc.) to its respective database. In one embodiment, one of the systems implements security features which prevent (or make impractical) the execution of commands to directly access the database of the other system.

The first system 110 may comprise a server computer and generally includes a central processing unit (CPU) 111, a main memory 112, and an input/output (I/O) processor 113. These system components are interconnected through a system bus 114. Input/output devices, such as a display monitor 115, a keyboard 116, and a pointing device 117 (e.g., mouse), are connected to the I/O processor 113. The first system 110 may further include one or more storage devices 118, such as RAID systems, direct access storage devices (DASDs), tape storage devices, CD-ROM (compact disc read only memory), disk drives and other optical or magnetic storage devices, connected through the I/O processor 113. Data files, software programs, and other information may be stored in the storage devices 118.

One or more software programs, such as an operating system 119, may be stored in the main memory 112 or alternatively, in the storage devices 118. The operating system 119 may be a suitable multitasking operating system; however, those skilled in the art will appreciate that the spirit and scope of the present invention is not limited to any one operating system. The operating system 119 may support a variety of programming environments. Operation of the first system 100 may be controlled by user input through I/O devices such as the keyboard 116 and the pointing device 117.

Other software programs or application programs, such as an interactive interface 120A, email code 126A and a problem management application 122, may also be stored in the main memory 112, or alternatively, in the storage devices 118. The storage devices 118 may have several databases 124 stored therein. In one embodiment, the problem management application 122 is UVATS and the databases 124 include an associated Lotus Notes database. Data stored in the databases may be utilized to perform tasks required by the interactive interface 120A and the problem management application 122.

The second system 130 may comprise a server computer and generally includes a central processing unit (CPU) 131, a main memory 132, and an input/output (I/O) processor 133. These system components are interconnected through a system bus 134. Input/output devices, such as a display monitor 135, a keyboard 136, and a pointing device 137 (e.g., mouse), are connected to the I/O processor 133. The second system 130 may further include one or more storage devices 138, such as RAID systems, direct access storage devices (DASDs), tape storage devices, CD-ROM (compact disc read only memory), disk drives and other optical or magnetic storage devices, connected through the I/O processor 133. Data files, software programs, and other information may be stored in the storage devices 138.

One or more software programs, such as an operating system 139, may be stored in the main memory 132 or, alternatively, in the storage devices 138. The operating system 139 may be a suitable multitasking operating system; however, those skilled in the art will appreciate that the spirit and scope of the present invention is not limited to any one operating system. The operating system 139 may support a variety of programming environments. Operation of the second system 130 may be controlled by user input through I/O devices such as the keyboard 136 and the pointing device 137.

Other software programs or application programs, such as an interactive interface 120B, email code 126B and a developer application 142 (e.g., a CMVC system), may also be stored in the main memory 132, or alternatively, in the storage devices 138. The storage devices 138 may have several databases 144 stored therein. In one embodiment, the developer application 142 is CMVC and the databases 144 include an associated AIX/UNIX or DB2 database. Data stored in the databases may be utilized to perform tasks required by the interactive interface 120B and the developer application 142.

A first plurality of user/client systems 150-1 to 150-n are connected to the first system 110 through a network 170A, and a second plurality of user/client systems 160-1 to 160-n are connected to the second system 130 through a network 170B. The networks 170A and 170B may be any local area network (LAN) or wide area network (WAN) capable of supporting the appropriate information exchange according to embodiments provided herein. In one embodiment, the networks 170A and 170B may each be a combination of LANs and WANs. In a particular embodiment, the networks 170A and 170B comprise the Internet. The client systems 150 and 160 and the server systems 110 and 130 may be respectively connected in communication through Transmission Control Protocol/Internet Protocol (TCP/IP) or other communication protocols.

Each of the user/client systems 150 and 160 may represent an individual computer or workstation utilized by a user who has access to the first server system 110 and the second server system 130, respectively. Each of the server systems may represent a server having a processor and a storage device containing a database or an application to which one or more users have access. For example, each client system 150 has access to the problem management application 122 while each client system 160 has access to the developer application 142.

Figure 2:
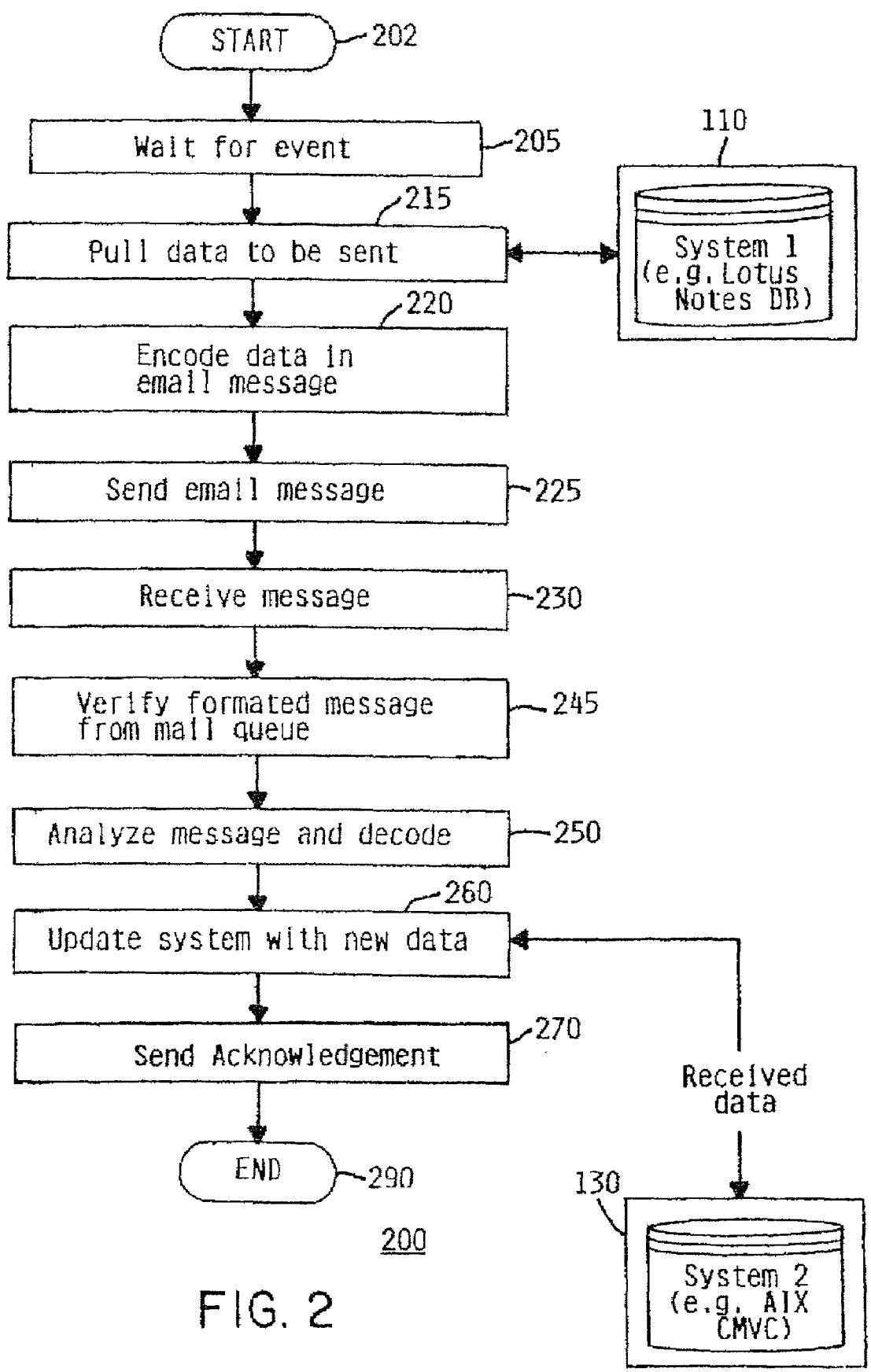
FIG. 2 is a flow chart illustrating one embodiment of a method for communicating between a first system and a second system.

FIG. 2 is a flow chart illustrating one embodiment of a method 200 for communicating between a first system and a second system by implementing the interactive interfaces 120A–B. The method 200 starts at block 202 and proceeds to block 205 to wait for an event which triggers communication through the interactive interface 120A on the first system 110. One example of a triggering event is a failure of a test performed by the first system 110 to evaluate an application being developed utilizing the second system 130.

Once a triggering event is received at block 205, the method 200 proceeds to retrieve data from one or more databases 124 in the first system 110 at block 215. The retrieved data is encoded or formatted to a predetermined format in an electronic document, such as an e-mail message, at block 220. The predetermined format may be specified by the interactive interface 120A. The encoded electronic document is sent to the second system at block 225. Block 225 includes invoking the email code 126A by the interactive interface 120A. The email code then handles the actual transmission of the encoded electronic document to the second system. The processes performed in blocks 215, 220 and 225 comprise the transmission portion of the communication between two systems and are implemented by the interactive interface 120A. Accordingly, the blocks 215, 220 and 225 each represent automatic steps implemented programmatically by the interactive interface 120A.

Figure 3:
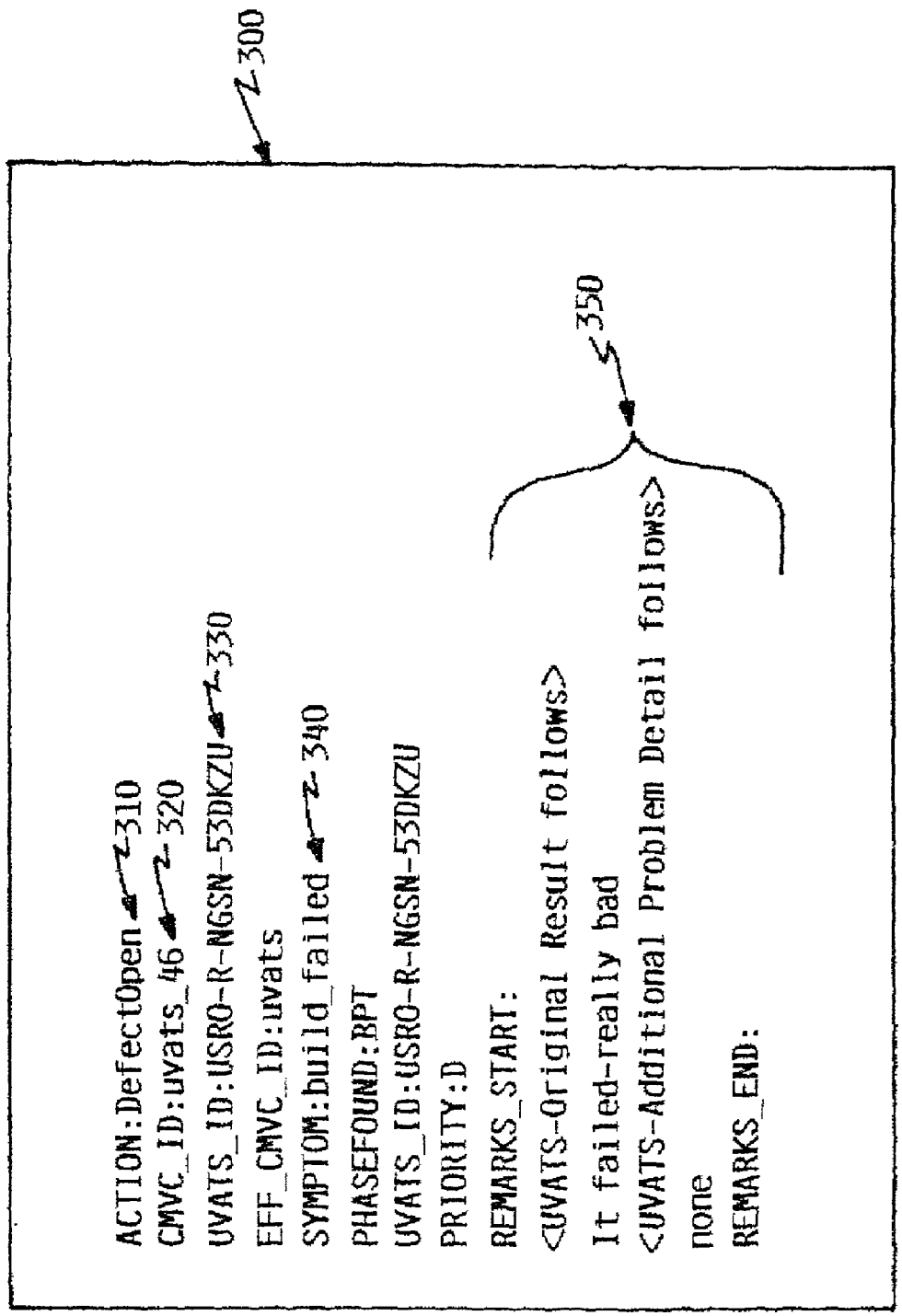
FIG. 3 illustrates one embodiment of an encoded electronic document 300.

Referring briefly to FIG. 3, one embodiment of an encoded electronic document 300 is illustrated. The electronic document 300 may be encoded in a specific format which allows the receiving interactive interface to decode the electronic document and extract data to be stored and/or commands to be performed by the receiving system. In one embodiment, the information contained in the encoded electronic document may include an action 310 to be performed by the receiving system, an identification 320 for the receiving system, an identification 330 for the transmitting system, a description of the defect/symptom 340, and a remarks section 350. It should be understood that the encoded electronic document 300 is merely illustrative and persons skilled in the art will recognize that the contents of any particular encoded electronic document will vary depending upon the type of encoded electronic document.

Incoming messages at the second system are initially handled by the email code 126B, which may operate to place the encoded electronic document in a mail queue. At block 230, the encoded electronic document is retrieved by the interactive interface 120B of the second system 130. The second system 130 then verifies whether the electronic document is an encoded electronic document (i.e., specially formatted message) at block 245. The encoded electronic document is analyzed and decoded at block 250 to produce the data sent by the first system. The method 200 then updates one or more databases in the second system 130 with the decoded data at block 260. In one embodiment, an acknowledgment is transmitted, at step 270, from the second system 130 to the first system 110. The processes performed in blocks 230, 245, 250, 260 and 270 comprise the reception portion of the communication between two systems and are implemented by the interactive interface 120B. Accordingly, the blocks 230, 245, 250, 260 and 270 each represent automatic steps implemented programmatically by the interactive interface 120B. The method 200 ends at block 290. To communicate from the second system to the first system, similar processes as those described for the method 200 may be performed, with the first system interchanged with the second system.

Figure 4:
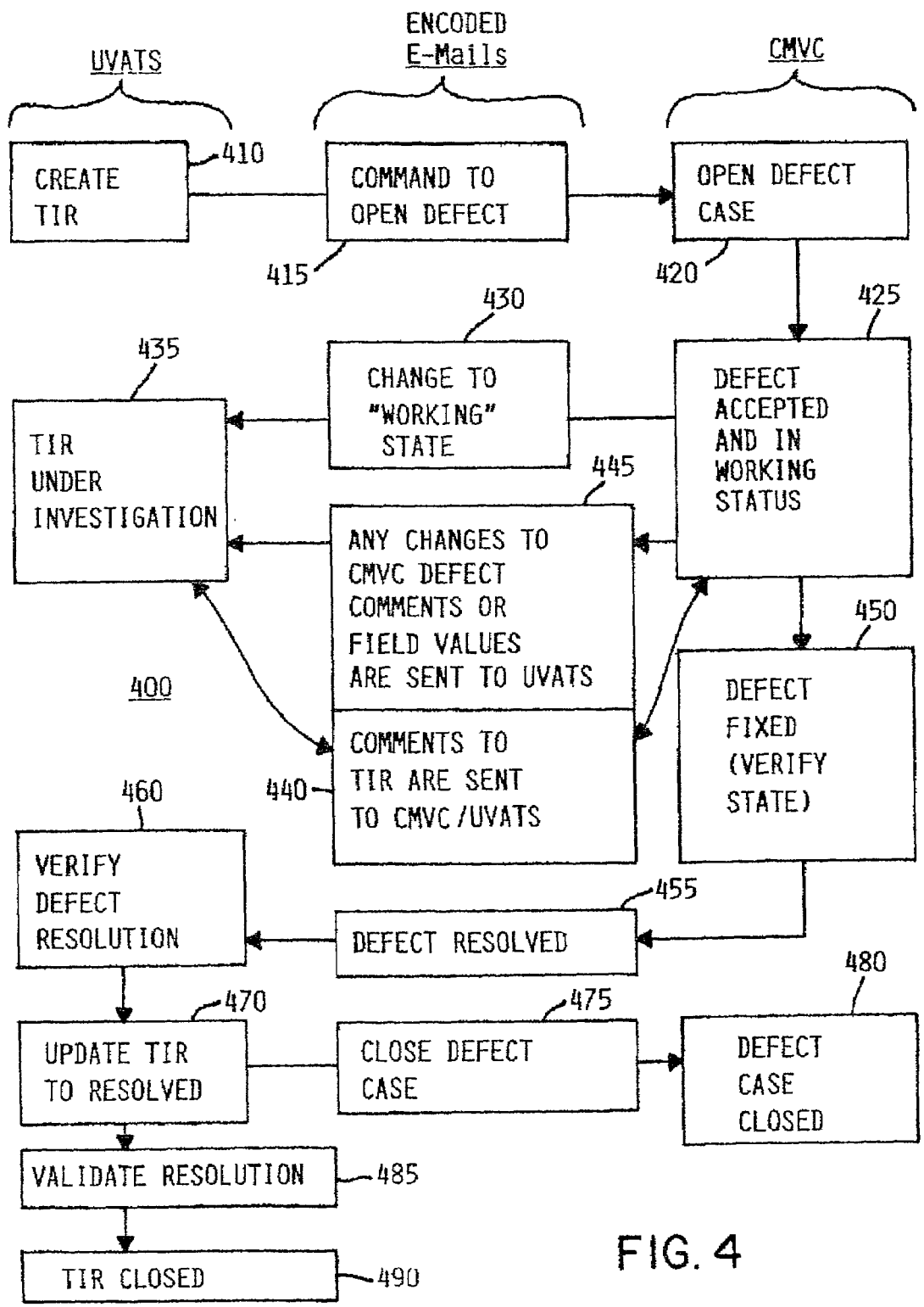
FIG. 4 is a schematic diagram illustrating exemplary communications between a problem management system (e.g., UVATS) and a developer system (e.g., CMVC) for detecting and resolving a defect in an application being developed in the developer system.

FIG. 4 is a schematic diagram illustrating exemplary communications between a problem management system (e.g., UVATS) and a developer system (e.g., CMVC) for detecting and resolving a defect in an application being developed in the developer system. It should be understood that the communications shown in FIG. 4 are merely illustrative and persons skilled in the art will recognize other methods similarly within the scope of the invention. To detect defects in an application which is being developed by users of the developer system, a user of the problem management system performs tests on the application. The tests may be performed utilizing test scripts. When test results are determined as failing certain criteria, one or more defects in the application may be documented in a test incident report (TIR) at block 410. With the creation of a TIR, the user of the problem management system sends a command to open a defect case to the developer system utilizing an encoded e-mail message through the interactive interface at block

415. The encoded e-mail message is received and decoded by the developer system, and a CMVC defect case is opened on the developer system at block 420. A user of the developer system accepts the defect and begins to work on a resolution for the defect at block 425. As the defect is accepted by a user of the developer system, an encoded e-mail message is sent from the developer system to the problem management system to indicate that the status of defect case has changed from a "defect found" status to a "working" status at block 430. The problem management system receives and decodes the e-mail message and updates the TIR at block 435 with the information that the defect has been accepted by the developer system and a resolution for the defect is under investigation.

At this stage of defect resolution, the problem management system and the developer system may communicate with each other utilizing encoded e-mails through the interactive interfaces on each system. For example, any additional comments made by users of the problem management system to the TIR are sent to the developer system and updated to the data for the defect case in the developer system (block 440). As another example, any changes to the defect comments or field values in the defect case are sent to the problem management system and updated to the data in the TIR (block 445).

When the defect has been fixed (i.e., a resolution for the defect is found), the defect case is moved to a "verify" status at block 450. The developer system then sends a notification (encoded e-mail) to the problem management system to indicate that the defect has been resolved at block 455. This notification also includes comments and/or changed fields which provide the resolution to the defect in the application. The notification is received by the problem management system, and the originator of the TIR (or another user of the problem management system) verifies that the defect has been resolved at block 460. The application may be re-tested to verify that the defect has been resolved. If the defect has been resolved, the data in the TIR is updated to indicate that the defect has been resolved at block 470. An encoded e-mail message is then sent to the developer system to close the defect case at block 475. After receiving and decoding the e-mail message, the developer system closes the defect case at block 480. The defect resolution may be validated (re-testing the resolution and/or application) at block 485, and if validated, the data in the TIR is updated to reflect a closed status at block 490.

The above-described example sends Lotus Notes® data via e-mail to the server that the CMVC® application resides on (without directly writing to any CMVC® data files). The e-mail waits in a queue to be processed by a shell program which reads the e-mail received, determines whether the e-mail is an encoded message, deciphers the message, and then processes the message using the appropriate method of data input via a CMVC® command. Communication from CMVC® to Lotus Notes® is accomplished in a similar manner.

In one embodiment, the interactive interfaces 120A–B are implemented using a combination of LotusScript® code implemented into the Lotus Notes® database (UVATS®) with appropriate triggers to send or pull information to/from CMVC®. The method for transporting the information between the systems comprises specially formatted e-mail messages. For the CMVC® application, user exit programs are utilized to call code to send information to UVATS® at appropriate times. The interactive interface enables communication between these two systems and removes many manual tasks that were previously necessary to update status and progress of the defect case. Furthermore, errors and delays due to these manual tasks are reduced because the interactive interface automatically retrieves and stores data to appropriate databases as triggered by the communication between the two systems.

While the foregoing is directed to embodiments of the present invention, other and further embodiments of the invention may be devised without departing from the basic scope thereof, and the scope thereof is determined by the claims that follow.

What is claimed is:

1. A computer-implemented method for communicating between systems, -comprising:
    providing a developer system configured for developing applications, the developer system comprising a first database;
    providing a problem management system configured to detect defects in the applications being developed on the developer system, the problem management system comprising a second database, in which at least one of the systems is configured to prevent the other of the two systems from directly accessing its respective database;
    determining, at the problem management system, storage of a test incident report in the second database, the test incident report documenting a defect with respect to an application being developed on the developer system;
    wherein the storage of the test incident report in the second database comprises a predetermined event causing automatic execution of a first database update operation to effect an update of the first database, the operation comprising:
        generating, at the problem management system, a first encoded electronic mail message containing the test incident report taken from the second database;
        invoking a first e-mail code to email the first encoded electronic mail message from the problem management system to the developer system;
        invoking a second e-mail code to receive, at the developer system, the first encoded electronic mail message;
        decoding the received first encoded electronic mail message to extract the test incident report; and
        modifying at least an item of data stored in the first database based on the contents of the extracted test incident report.

2. The method of claim 1, wherein the first electronic mail message contains information selected from at least one of: an action to be performed by the developer system, an identification for the second system, an identification for the first system, a description of an application defect, and a remark.

3. The method of claim 1, wherein the problem management system comprises a Lotus® Notes® system.

4. The method of claim 1, wherein the developer system comprises a Configuration Management and Version Control application.

5. The method of claim 1, further comprising, in response to receiving at the developer system an indication of the defect having been fixed, automatically executing a second database update operation to effect an update of the second database, the second operation comprising:
    generating, at the developer system, a second encoded electronic mail message containing a resolution document taken from the first database, the resolution document documenting the fix of the defect;

invoking the second e-mail code to email the second encoded electronic mail message from the developer system to the problem management system;

invoking the first e-mail code to receive, at the problem management system, the second encoded electronic mail message;

decoding the received second encoded electronic mail message to extract the resolution document; and modifying at least an item of data stored in the second database based on the contents of the extracted resolution document.

6. The method of claim 5, wherein modifying at least the item of data stored in the second database based on the contents of the extracted resolution document is done only after independently verifying that the defect has been fixed.

7. A computer system, comprising:

(a) at least one processor and at least one memory containing instructions executable by the at least one processor;

(b) a developer system defined as at least a first portion of the instructions which when executed by the at least one processor configures the at least one processor for developing applications, the developer system comprising:

a first database;

a first e-mail communications facility configured to encode, send and decode electronic mail messages; and a first interactive interface; and (c) a problem management system defined as at least a second portion of the instructions which when executed by the at least one processor configures the at least one processor to detect defects in the applications being developed on the developer system, the problem management system comprising:

a second database;

a second e-mail communications facility configured to encode, send and decode electronic mail messages; and a second interactive interface;

(d) a network connecting the first system and the second system; wherein in which at least one of the two systems is configured to prevent the other of the two systems from directly accessing its respective database and wherein the systems are configured to automatically initiate email-based database update operations in response to predetermined events;

wherein the problem management system is configured to initiate a first database update operation in response to a first predetermined event comprising storage, at the problem management system, of a test incident report in the second database, the test incident report documenting a defect with respect to an application being developed on the developer system; wherein the first database update operation is configured to effect an update of the first database, the first database update operation comprising:

generating, at the problem management system, a first encoded electronic mail message containing the test incident report taken from the second database;

invoking a first e-mail code to email the first encoded electronic mail message from the problem management system to the developer system;

invoking a second e-mail code to receive, at the developer system, the first encoded electronic mail message;

decoding the received first encoded electronic mail message to extract the test incident report; and modifying at least an item of data stored in the first database based on the contents of the extracted test incident report; and wherein the developer system is configured to initiate a second database update operation, to effect an update of the second database, in response to a second predetermined event comprising an indication of the defect having been fixed, the second operation comprising:

generating, at the developer system, a second encoded electronic mail message containing a resolution document taken from the first database, the resolution document documenting the fix of the defect;

invoking the second e-mail code to email the second encoded electronic mail message from the developer system to the problem management system;

invoking the first e-mail code to receive, at the problem management system, the second encoded electronic mail message;

decoding the received second encoded electronic mail message to extract the resolution document; and modifying at least an item of data stored in the second database based on the contents of the extracted resolution document.

8. The system of claim 7, wherein the problem management system comprises a Lotus® Notes® system.

9. The system of claim 7, wherein the developer system comprises a Configuration Management and Version Control application.

10. The system of claim 7, wherein the first and second e-mail communications facilities comprise e-mail clients.

11. The system of claim 7, wherein modifying at least the item of data stored in the second database based on the contents of the extracted resolution document is done only after independently verifying that the defect has been fixed.

12. The system of claim 7, wherein the first encoded electronic mail message contains information selected from at least one of: an action to be performed, a system identification, a description of a defect, and a remark.

13. A tangible storage medium, comprising a program which, when executed by a processor, performs an operation for communicating between a developer system configured for developing applications and a problem management system configured to detect defects in the applications being developed on the developer system, the systems having a first database and a second database, respectively, in which at least one of the systems is configured to prevent the other of the two systems from directly accessing its respective database, the operation comprising:

detecting, at the problem management system, storage of a test incident report in the second database, the test incident report documenting a defect with respect to an application being developed on the developer system; wherein the storage of the test incident report in the second database comprises a predetermined event causing automatic execution of a first database update operation to effect an update of the first database, the first database update operation comprising:

generating, at the problem management system, a first encoded mail message containing the test incident report taken from the second database;

invoking a first e-mail code to email the first encoded electronic mail message from the problem management system to the developer system;

invoking a second e-mail code to receive, at the developer system, the first encoded electronic mail message;

decoding the received first encoded electronic mail message to extract the test incident report; and modifying at least an item of data stored in the first database based on the contents of the extracted test incident report.

14. The tangible storage medium of claim 13, wherein the first electronic mail message contains information selected from at least one of: an action to be performed by the developer system, an identification for the second system, an identification for the first system, a description of an application defect, and a remark.

15. The tangible storage medium of claim 13, wherein the problem management system comprises a Lotus® Notes® system.

16. The tangible storage medium of claim 13, wherein the developer system comprises a Configuration Management and Version Control application.

17. The tangible storage medium of claim 13, further comprising, in response to receiving at the developer system an indication of the defect having been fixed, automatically executing a second database update operation to effect an update of the second database, the second database update operation comprising:

generating, at the developer system, a second encoded electronic mail message containing a resolution document taken from the first database, the resolution document documenting the fix of the defect;

invoking the second e-mail code to email the second encoded electronic mail message from the developer system to the problem management system;

invoking the first e-mail code to receive, at the problem management system, the second encoded electronic mail message;

decoding the received second encoded electronic mail message to extract the resolution document; and modifying at least an item of data stored in the second database based on the contents of the extracted resolution document.

18. The tangible storage medium of claim 17, wherein modifying at least the item of data stored in the second database based on the contents of the extracted resolution document is done only after independently verifying that the defect has been fixed.

* * * * *